US008958083B2

(12) United States Patent
Shozaki

(10) Patent No.: US 8,958,083 B2
(45) Date of Patent: Feb. 17, 2015

(54) IMAGE FORMING APPARATUS, DISPLAY CONTROL METHOD, AND NON-TRANSITORY COMPUTER-READABLE RECORDING MEDIUM ENCODED WITH DISPLAYING CONTROL PROGRAM FOR DISPLAYING AN IMAGE OF A HELP SCREEN

(75) Inventor: Toshiya Shozaki, Osaka (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 667 days.

(21) Appl. No.: 13/226,894

(22) Filed: Sep. 7, 2011

(65) Prior Publication Data

US 2012/0062947 A1     Mar. 15, 2012

(30) Foreign Application Priority Data

Sep. 15, 2010    (JP) .................................. 2010-206710

(51) Int. Cl.
*G06F 3/12*      (2006.01)
*G05B 19/409*    (2006.01)

(52) U.S. Cl.
CPC .... *G05B 19/409* (2013.01); *G05B 2219/36159* (2013.01); *G05B 2219/36163* (2013.01);
(Continued)

(58) Field of Classification Search
CPC ..................... H04N 2201/0075; G06F 3/1204; G06F 3/1229; G06F 3/1292; G05B 19/409; G05B 19/36159; G05B 19/36163; G05B 19/45187
USPC ................................................ 358/1.13–1.17
See application file for complete search history.

(56) References Cited

U.S. PATENT DOCUMENTS 7,031,661 B2 *  4/2006  Berkema et al. ............. 455/41.3
7,327,478 B2    2/2008  Matsuda
(Continued)

FOREIGN PATENT DOCUMENTS

EP      1 739 945 A1     1/2007
JP      2002-359718 A    12/2002
(Continued)

OTHER PUBLICATIONS

Extended European Search Report issued on Jul. 26, 2013, by the European Patent Office in corresponding European Patent Application No. 11180007.4. (7 pages).
(Continued)

*Primary Examiner* — Benny Q Tieu
*Assistant Examiner* — Quyen V Ngo
(74) *Attorney, Agent, or Firm* — Buchanan Ingersoll & Rooney PC

(57) ABSTRACT

An image forming apparatus includes: a communication portion to communicate with a portable information device; an operation accepting portion to accept an operation by a user; an operation state switching portion to switch an operation state between an operating state showing a state in which a user is inputting an operation to the operation accepting portion and a non-operating state that is not the operating state; a display portion to display an image; an operation screen transmission portion to, in response to a request being received from the portable information device when an operation state is being switched to the non-operating state, transmit an operation screen corresponding to the received request to the portable information device through the communication portion; and a display control portion to, in response to transmission of the operation screen, display an image different from the operation screen on the display portion.

24 Claims, 11 Drawing Sheets

(52) U.S. Cl.
CPC ............. *G05B2219/45187* (2013.01); *H04N 2201/0075* (2013.01); *G06F 3/1204* (2013.01); *G06F 3/1229* (2013.01); *G06F 3/1292* (2013.01)
USPC ....... 358/1.13; 358/1.14; 358/1.15; 358/1.16; 358/1.17

(56) References Cited

U.S. PATENT DOCUMENTS

| | | | |
|---|---|---|---|
| 7,603,189 | B2 | 10/2009 | Tanaka et al. |
| 7,701,602 | B2* | 4/2010 | Burke et al. ................ 358/1.15 |
| 2006/0290680 | A1 | 12/2006 | Tanaka et al. |
| 2007/0208863 | A1* | 9/2007 | Otsuka et al. ................ 709/227 |
| 2007/0223029 | A1* | 9/2007 | Nonaka ........................ 358/1.14 |
| 2007/0253013 | A1* | 11/2007 | Shudo .......................... 358/1.14 |
| 2007/0256020 | A1 | 11/2007 | Haga |
| 2008/0192287 | A1* | 8/2008 | Iwai ............................. 358/1.15 |
| 2009/0103124 | A1* | 4/2009 | Kimura et al. ............... 358/1.15 |
| 2009/0190157 | A1 | 7/2009 | Ferlitsch |
| 2009/0303884 | A1* | 12/2009 | Kimura et al. ............... 370/242 |
| 2010/0231946 | A1* | 9/2010 | Shozaki et al. .............. 358/1.13 |

FOREIGN PATENT DOCUMENTS

| | | |
|---|---|---|
| JP | 2003-069780 A | 3/2003 |
| JP | 2004-066502 A | 3/2004 |
| JP | 2007-043647 A | 2/2007 |
| JP | 2008-219351 A | 9/2008 |
| JP | 2009-176290 A | 8/2009 |
| JP | 2010-41238 A | 2/2010 |

OTHER PUBLICATIONS

Office Action issued on Dec. 4, 2013, by the Chinese Patent Office in corresponding Chinese Patent Application No. 2013112901129300, and an English Translation of the Office Action. (15 pages).

Office Action (Notice of Ground of Rejection) dated Jul. 3, 2012, issued in corresponding Japanese Patent Application No. 2010-206710, and an English Translation thereof. (10 pages).

* cited by examiner

REGISTRATION TABLE

| REGISTERED DEVICE NAME | REGISTERED IMAGE |
|---|---|
| DEVICE IDENTIFICATION INFORMATION | URL |

F I G. 1 1
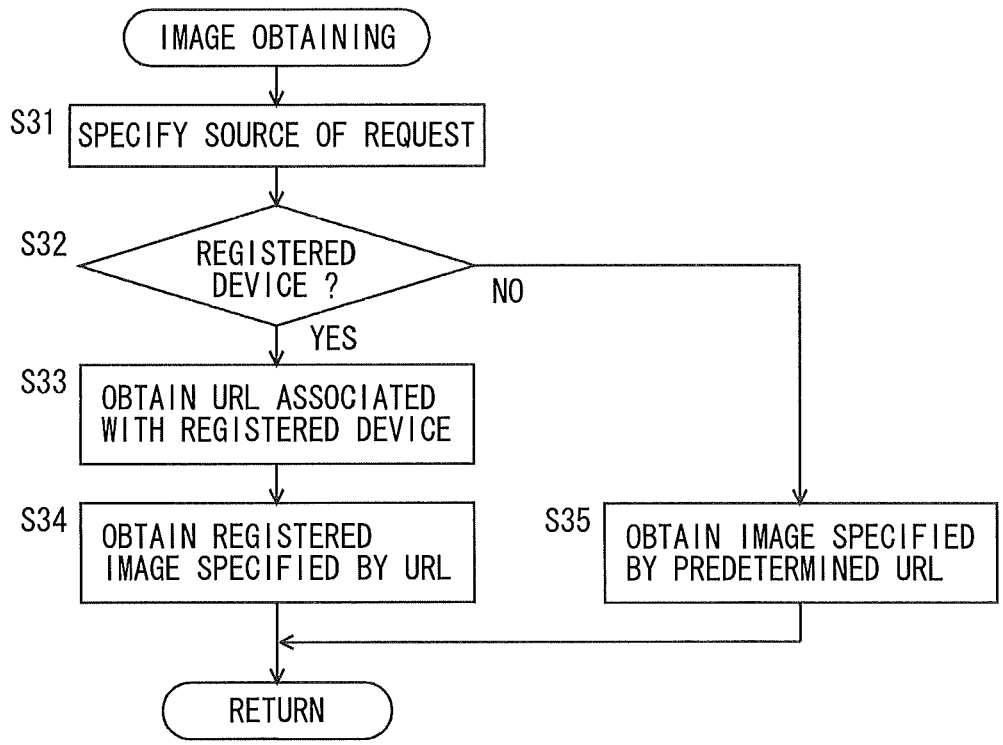

IMAGE FORMING APPARATUS, DISPLAY CONTROL METHOD, AND NON-TRANSITORY COMPUTER-READABLE RECORDING MEDIUM ENCODED WITH DISPLAYING CONTROL PROGRAM FOR DISPLAYING AN IMAGE OF A HELP SCREEN

This application is based on Japanese Patent Application No. 2010-206710 filed with Japan Patent Office on Sep. 15, 2010, the entire content of which is hereby incorporated by reference.

BACKGROUND OF THE INVENTION

1. Field of the Invention

The present invention relates to an image forming apparatus, a display control method, and a non-transitory computer-readable recording medium encoded with a display control program. More specifically, the present invention relates to an image forming apparatus remotely operated from the outside, a display control method executed in the image forming apparatus, and a non-transitory computer-readable recording medium encoded with a display control program.

2. Description of the Related Art

In recent years, the functions of MFPs (Multi Function Peripherals) are so complicated that their operation screens for setting operations range widely in contents and setting items. Moreover, as an MFP is used by a plurality of users, a user who has little opportunity to operate the MFP may find it difficult to learn the complicated operation procedures.

On the other hand, portable information devices such as mobile phones and PDAs (Personal Digital Assistants) provide higher functions and increase in variety in response to personal needs. Those devices, carried along by individuals, are used more frequently than MFPs, so that their operations are familiar to users. Such devices have functions similar to the functions of MFPs, such as transmission/reception of data and browser operations. The color information and language information of display screens and sound functions of portable information terminals are often customized to be user-friendly.

For example, Japanese Patent Laid-Open No. 2004-66502 discloses a technique of connecting a portable information device to an MFP for remotely operating the printing apparatus from the portable information device. However, with the technique described in Japanese Patent Laid-Open No. 2004-66502, the user remotely operates the printing apparatus from the portable information device, and thus, information is not displayed on the display of the printing apparatus. Therefore, the display is not effectively used.

SUMMARY OF THE INVENTION

In accordance with an aspect of the present invention, an image forming apparatus includes: a communication portion to communicate with a portable information device; an operation accepting portion to accept an operation by a user; an operation state switching portion to switch an operation state between an operating state showing a state in which a user is inputting an operation to the operation accepting portion and a non-operating state that is not the operating state; a display portion to display an image; an operation screen transmission portion to, in response to a request being received from the portable information device when an operation state is being switched to the non-operating state, transmit an operation screen corresponding to the received request to the portable information device through the communication portion; and a display control portion to, in response to transmission of the operation screen, display an image different from the operation screen on the display portion.

In accordance with another aspect of the present invention, a display control method is executed in an image forming apparatus including a communication portion to communicate with a portable information device, an operation accepting portion to accept an operation by a user, and a display portion to display an image. The method includes the steps of: switching an operation state between an operating-state indicating a state in which a user is inputting an operation to the operation accepting portion and a non-operating state that is not the operating state; in response to a request being received from the portable information device when an operation state is being switched to the non-operating state, transmitting an operation screen corresponding to the received request to the portable information device through the communication portion; and in response to transmission of the operation screen, displaying an image different from the operation screen on the display portion.

In accordance with a further aspect of the present invention, a non-transitory computer-readable recording medium is encoded with a display control program executed in a computer controlling an image forming apparatus including a communication portion to communicate with a portable information device, an operation accepting portion to accept an operation by a user, and a display portion to display an image. The program causes the computer to execute processing comprising the steps of: switching an operation state between an operating-state indicating a state in which a user is inputting an operation to the operation accepting portion and a non-operating state that is not the operating state; in response to a request being received from the portable information device when an operation state is being switched to the non-operating state, transmitting an operation screen corresponding to the received request to the portable information device through the communication portion; and in response to transmission of the operation screen, displaying an image different from the operation screen on the display portion.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 11 is a flowchart showing an exemplary flow of an image obtaining process.

DESCRIPTION OF THE PREFERRED EMBODIMENTS

Figure 1:
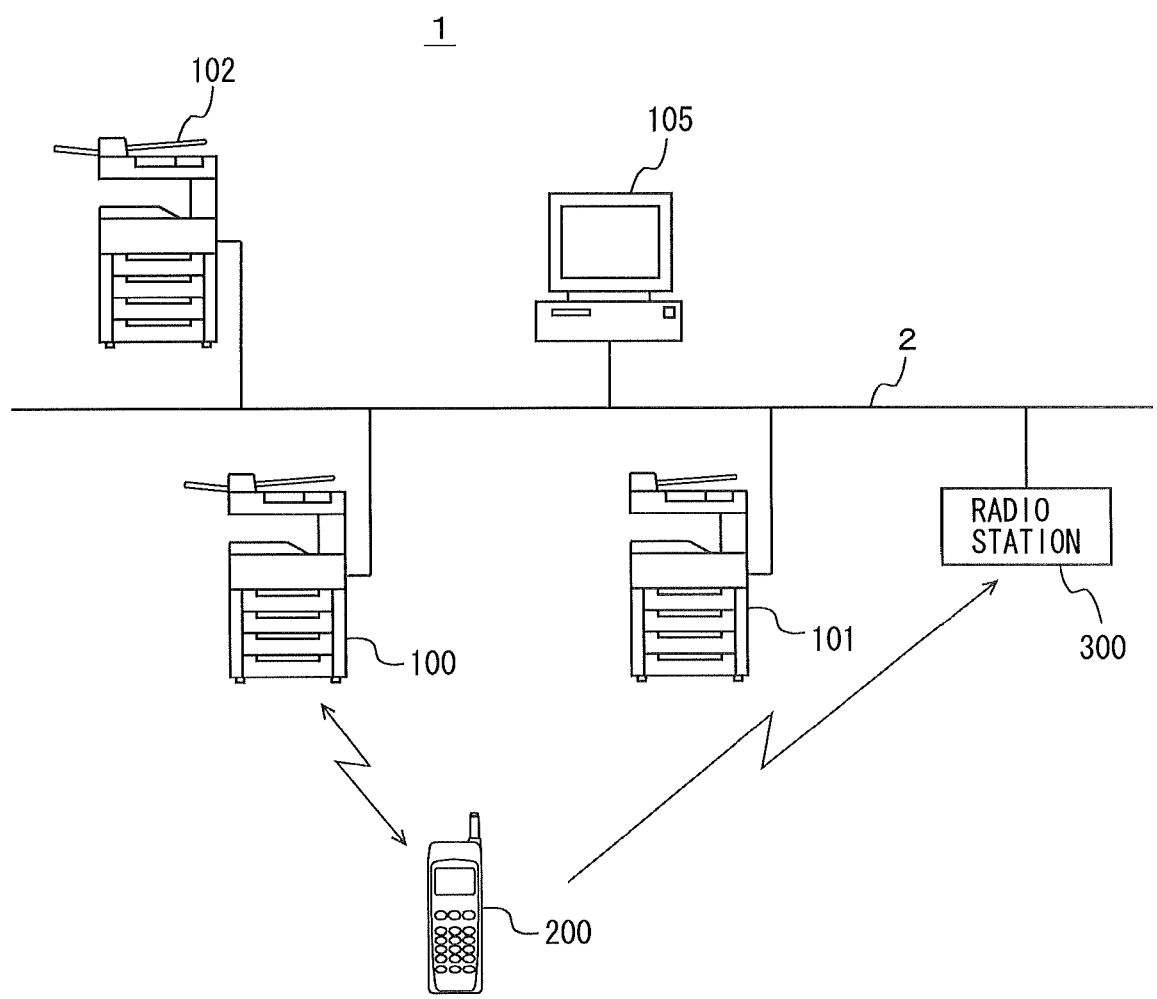
FIG. 1 is a diagram showing an overview of an image forming system in an embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

FIG. 1 is a diagram showing an overview of an image forming system in an embodiment of the present invention. Referring to FIG. 1, an image forming system 1 includes MFPs (Multi Function Peripherals) 100, 101, 102 each serving as an image forming apparatus, a personal computer (hereinafter referred to as "PC") 105, a portable information device 200, and a radio station 300, each being connected to a network 2.

PC 105 is a general computer and is installed with a printer driver program for controlling MFPs 100, 101, 102. If MFPs 100, 101, 102 are of different kinds, three kinds of printer driver programs for controlling MFPs 100, 101, 102 are installed in PC 105.

MFPs 100, 101, 102 each include a scanner for scanning a document, an image forming apparatus for forming an image on a recording medium such as paper based on image data, and a facsimile machine, and have an image scanning function, a copy function, and a facsimile transmission/reception function. Although MFPs 100, 101, 102 are taken as an example in the present embodiment, MFPs 100, 101, 102 may be replaced, for example, with a printer, a facsimile machine, or any other device having a function of forming an image. MFPs 100, 101, 102 have the same functions, and therefore, in the following description, MFP 100 is taken as an example, unless otherwise specified.

Portable information device 200 is a general mobile phone and is able to make calls and communicate data by wirelessly communicating with a base station connected to a mobile phone network and then connecting to the mobile phone network. Portable information device 200 includes a wireless LAN function to be able to connect to network 2 through radio station 300. Portable information device 200 is not limited to a mobile phone and may be a small computer such as a PDA (Personal Digital Assistant).

Network 2 is a Local Area Network (LAN), either wired or wireless. Network 2 is not limited to a LAN and may be a network using a Public Switched Telephone Network. Network 2 is connected to a Wide Area Network such as the Internet.

Radio station 300 is a relay for network 2 and communicates with portable information device 200 having a wireless LAN communication function to connect portable information device 200 to network 2. MFPs 100, 101, 102 each can transmit/receive data to/from PC 105 over network 2. MFPs 100, 101, 102 each can transmit/receive data to/from portable information device 200 via network 2 and radio station 300.

MFPs 100, 101, 102 each may wirelessly connect with portable information device 200 directly, using a short-distance wireless communication standard such as Bluetooth (R) to transmit/receive data.

Figure 2:
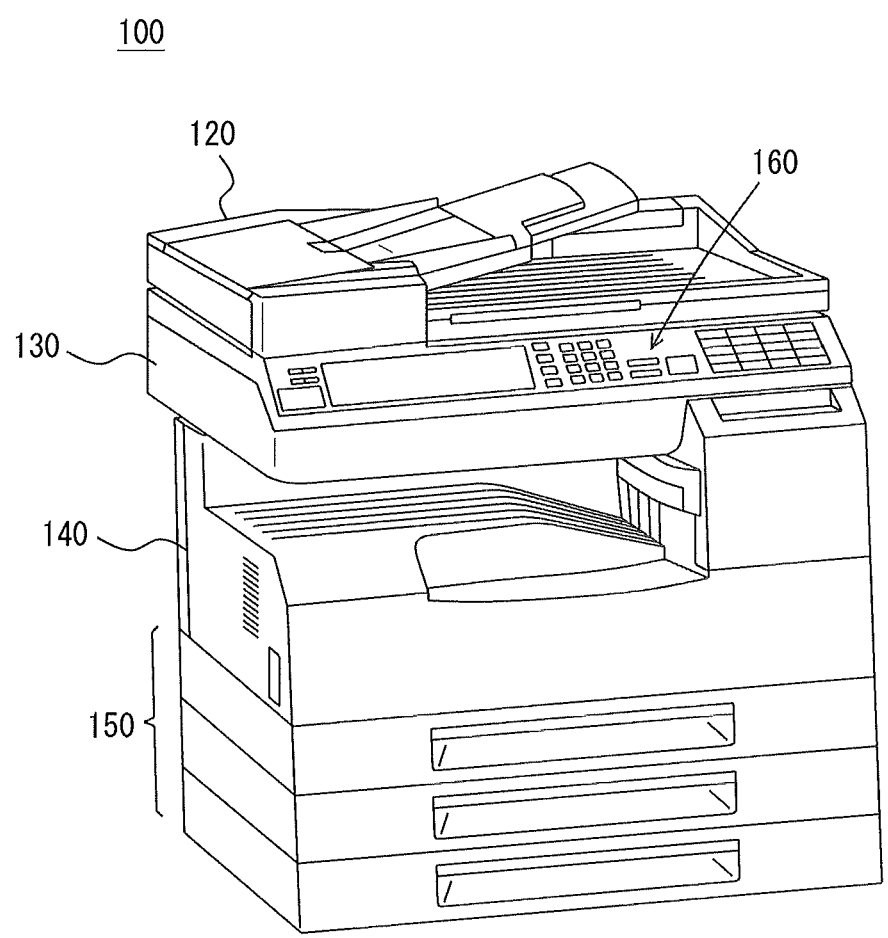
FIG. 2 is an external perspective view of an MFP.
Figure 3:
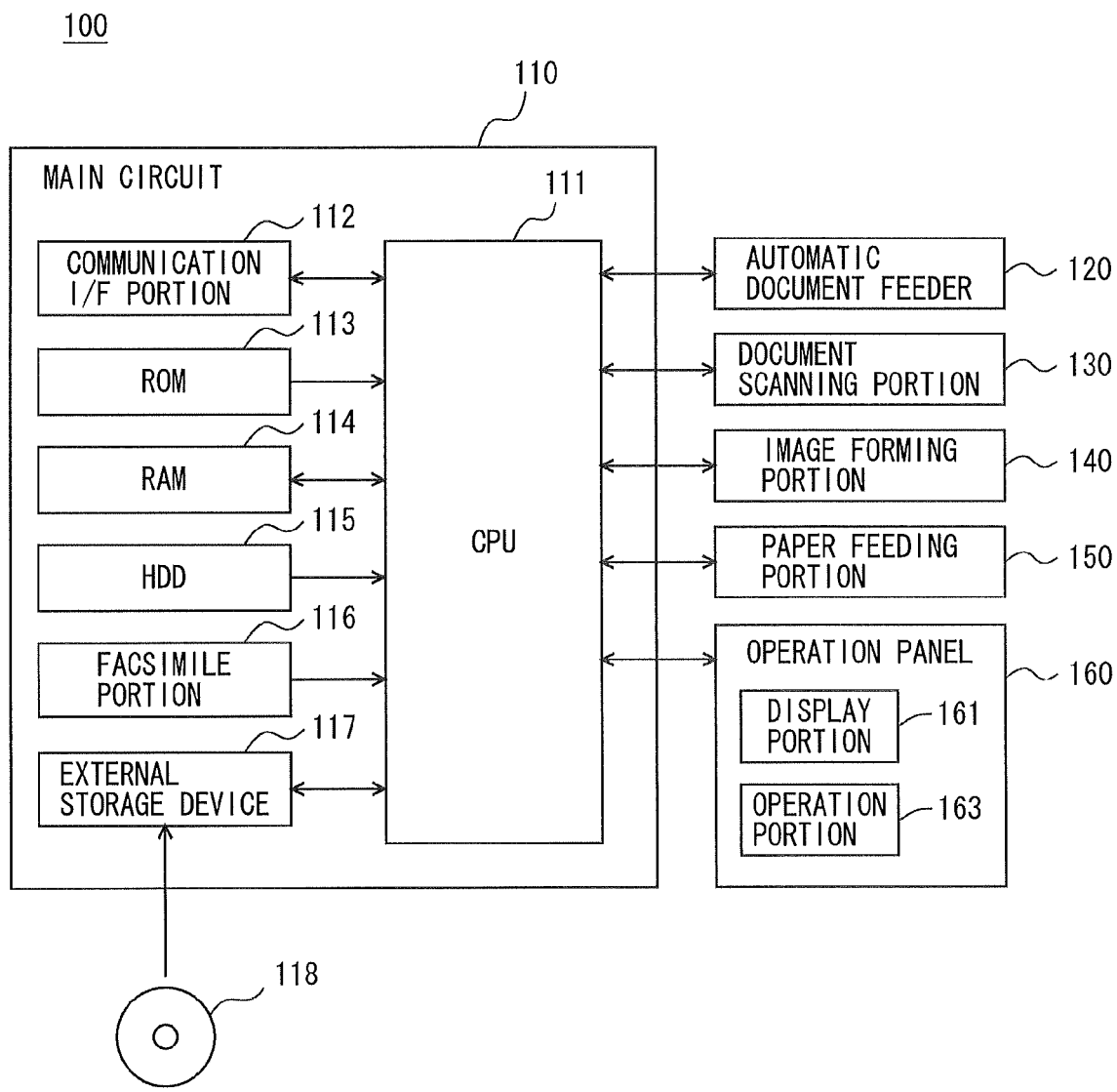
FIG. 3 is a block diagram schematically showing a hardware configuration of the MFP.

FIG. 2 is an external perspective view of an MFP. FIG. 3 is a block diagram schematically showing a hardware configuration of the MFP. Referring to FIG. 2 and FIG. 3, MFP 100 includes a main circuit 110, a document scanning portion 130 for scanning a document, an automatic document feeder 120 for conveying a document to document scanning portion 130, an image forming portion 140 for forming an image, for example, on paper based image data output by document scanning portion 130 scanning a document, a paper-feeding portion 150 for supplying paper to image forming portion 140, and an operation panel 160 as a user interface.

Main circuit 110 includes a CPU 111, a communication interface (I/F) portion 112, a ROM (Read Only Memory) 113, a RAM (Random Access Memory) 114, a hard disk drive (HDD) 115 as a mass storage device, a facsimile portion 116, and an external storage device 117 to which a CD-ROM (Compact Disk Read Only Memory) 118 is attached. CPU 111 is connected to automatic document feeder 120, document scanning portion 130, image forming portion 140, paper-feeding portion 150, and operation panel 160 to control MFP 100 as a whole.

ROM 113 stores a program to be executed by CPU 111 or data necessary to execute the program. RAM 114 is used as a work area when CPU 111 executes a program. RAM 114 also temporarily stores scanned images successively sent from document scanning portion 130.

Operation panel 160 is provided on the top surface of MFP 100 and includes a display portion 161 and an operation portion 163. Display portion 161 is a display such as a liquid crystal display (LCD) or an organic ELD (Electroluminescence Display) and displays, for example, instruction menus for the users and information concerning the obtained image data. Operation portion 163 includes a plurality of keys and accepts input of instructions and data such as characters and numerals through user's operations corresponding to the keys. Operation portion 163 further includes a touch-panel provided on display portion 161.

Communication I/F portion 112 is an interface for connecting MFP 100 to network 2. CPU 111 communicates with MFP 101, 102, PC 105, or portable information device 200 through communication I/F portion 112 to transmit/receive data. Communication I/F portion 112 can also communicate with a computer connected to the Internet via network 2.

Facsimile portion 116 is connected to a Public Switched Telephone Network (PSTN) to transmit facsimile data to PSTN or receive facsimile data from PSTN. Facsimile portion 116 stores the received facsimile data into HDD 115 or outputs the same to image forming portion 140. Image forming portion 140 prints the facsimile data received by facsimile portion 116 on paper. In addition, facsimile portion 116 converts data stored in HDD 115 into facsimile data and transmits the facsimile data to a facsimile machine connected to PSTN.

CD-ROM 118 is attached to external storage device 117. CPU 111 can access CD-ROM 118 through external storage device 117. CPU 111 loads a program recorded on CD-ROM 118 attached to external storage device 117, into RAM 114 for execution. It is noted that the program executed by CPU 111 is not limited to a program recorded on CD-ROM 118, and a program stored in HDD 115 may be loaded into RAM 114 for execution. In this case, another computer connected to network 2 may overwrite the program stored in HDD 115 of MFP 100 or may additionally write a new program. Furthermore, MFP 100 may download a program from another computer connected to network 2 and store the program into HDD 115. The program referred to herein includes not only a program directly executable by CPU 111 but also a source program, a compressed program, an encrypted program, and the like.

In image forming system 1 in the present embodiment, data is communicated between MFPs 100, 101, 102 and portable information device 200. Any protocol can be used for communicating data as long as a transmission source can be specified at the receiving device. The protocol used for communicating data is, for example, HTTP (HyperText Transfer Protocol), FTP (File Transfer Protocol), SMPT (Simple Mail Transfer Protocol), or POP (Post Office Protocol).

Figure 4:
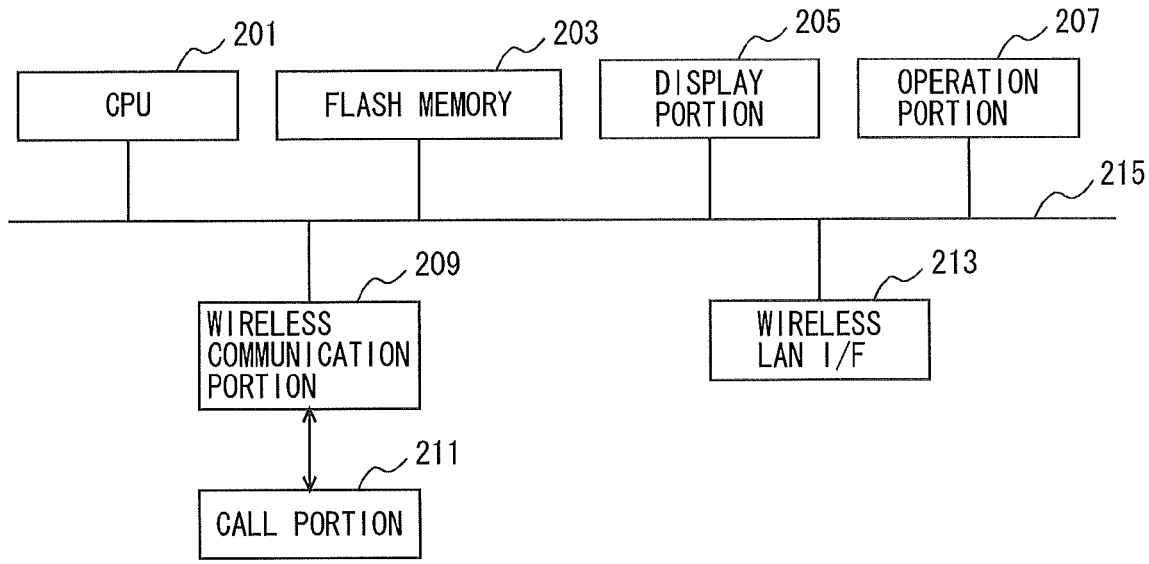
FIG. 4 is a functional block diagram schematically showing a hardware configuration of a portable information terminal.

FIG. 4 is a functional block diagram schematically showing a hardware configuration of the portable information device. Referring to FIG. 4, portable information device 200 includes a CPU 201 for controlling the entire portable information device 200, a flash memory 203 storing data in a nonvolatile manner, a display portion 205 displaying information, an operation portion 207 accepting input of user's operations, a wireless communication portion 209 connected to a call portion 211, and a wireless LAN I/F 213.

Wireless communication portion 209 wirelessly communicates with a mobile phone base station connected to a mobile phone network. Wireless communication portion 209 connects portable information device 200 to the mobile phone network to enable data communications and calls using call portion 211. When communicating data, wireless communication portion 209 decodes a radio signal received from the mobile phone base station and outputs the decoded data to CPU 201. Wireless communication portion 209 encodes data input from CPU 201 and transmits the encoded data to the mobile phone base station.

When making a call, wireless communication portion 209 demodulates a radio signal received from the mobile phone base station, decodes the demodulated voice signal, and outputs the decoded signal to call portion 211. Wireless communication portion 209 encodes sound input from call portion 211 and transmits the encoded sound to the mobile phone base station. Call portion 211 includes a microphone and a speaker, outputs sound input from wireless communication portion 209 from the speaker, and outputs sound input from the microphone to wireless communication portion 209.

Display portion 205 is a display such as a liquid crystal display (LCD) or an organic ELD and displays instruction menus for users and information concerning the obtained image data. Operation portion 207 includes a plurality of keys and accepts input of a variety of instructions and data such as characters and numerals through user's operations corresponding to the keys.

Wireless LAN I/F 213 is an interface for communicating with radio station 300 and connecting portable information device 200 to network 2. When MFPs 100, 101, 102 function as Web servers, the URLs (Uniform Resource Locators) of Web pages stored by MFPs 100, 101, 102 are registered beforehand in portable information device 200 so that portable information device 200 can receive the Web pages from MFPs 100, 101, 102 and can transmit/receive data. The IP (Internet Protocol) addresses or MAC (Media Access Control) addresses of MFPs 100, 101, 102 may be registered beforehand in order to communicate with MFPs 100, 101, 102 using the IP addresses and MAC addresses.

In the image forming system in the present embodiment, MFPs 100, 101, 102 can be remotely operated by portable information device 200. Therefore, a program for being remotely operated by portable information device 200 is installed in MFPs 100, 101, 102, and a program for remotely operating is installed in portable information device 200. For example, in the image forming system in the present embodiment, a server-client system is used to implement remote operation on MFPs 100, 101, 102 by portable information device 200.

Figure 5:
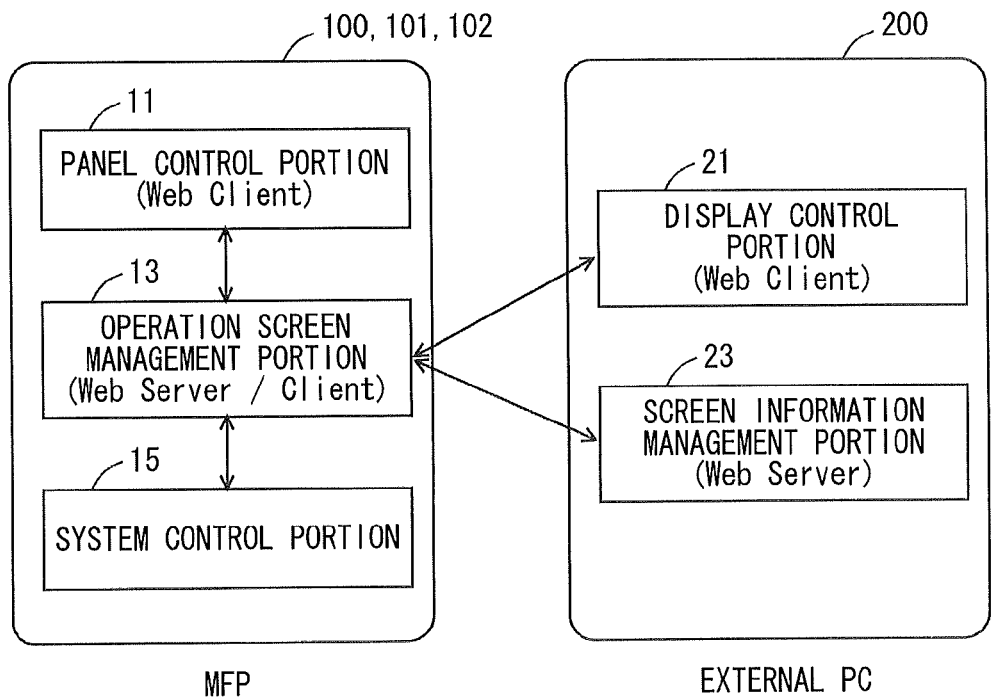
FIG. 5 illustrates a concept of a server-client system in the image forming system.

FIG. 5 illustrates a concept of a server-client system in the image forming system. Referring to FIG. 5, MFPs 100, 101, 102 each include a panel control portion 11, an operation screen management portion 13, and a system control portion 15. System control portion 15 controls automatic document feeder 120, document scanning portion 130, image forming portion 140, and paper-feeding portion 150 of each of MFPs 100, 101, 102. Portable information device 200 includes a display control portion 21 and a screen information management portion 23. Operation screen management portion 13 functions as a Web server, and panel control portion 11 and display control portion 21 function as a Web client for operation screen management portion 13. Operation screen management portion 13 also functions as a Web client, and screen information management portion 23 functions as a Web server for operation screen management portion 13 functioning as a Web client.

More specifically, panel control portion 11, implemented, for example, by CPU 111 executing a browsing program, requests an operation screen from operation screen management portion 13 serving as a Web server and displays an operation screen output by operation screen management portion 13 on display portion 161. Panel control portion 11 accepts an operation input to operation portion 163 by a user in accordance with an operation screen appearing on display portion 161 and outputs the accepted operation to operation screen management portion 13 serving as a Web server. Upon receiving the operation from panel control portion 11, operation screen management portion 13 executes, for example, CGI (Common Gateway Interface) to output an instruction to system control portion 15.

Display control portion 21 of portable information device 200, implemented, for example, by CPU 201 executing a browsing program, requests an operation screen from operation screen management portion 13 serving as a Web server and displays an operation screen output by operation screen management portion 13 on display portion 205. Display control portion 21 accepts an operation input to operation portion 207 by a user in accordance with an operation screen appearing on display 205 and outputs the accepted operation to operation screen management portion 13 serving as a Web server. Upon receiving the operation from display control portion 21, operation screen management portion 13 executes, for example, CGI to output an instruction to system control portion 15. The remote operation on MFPs 100, 101, 102 by portable information device 200 is thus implemented.

Screen information management portion 23 of portable information device 200 manages screens stored beforehand in portable information device 200 and, in response to a request, outputs a screen itself or the network address of a screen, such as a URL. Operation screen management portion 13 of MFPs 100, 101, 102 functions as a Web client for screen information management portion 23 while functioning as a Web server for display control portion 21. When panel control portion 11 of MFPs 100, 101, 102 requests an operation screen from operation screen management portion 13 serving as a Web server, operation screen management portion 13 functions as a Web client and outputs a display instruction request to screen information management portion 23 serving as a Web server. Screen information management portion 23 outputs a display instruction in response to the display instruction request, so that operation screen management portion 13 functioning as a Web client receives the display instruction from screen information management portion 23.

The display instruction, which will be described later, is information for specifying a screen. Upon receiving the display instruction from screen information management portion 23, operation screen management portion 13 functions as a Web server and outputs a screen specified by the display instruction input from screen information management portion 23 to panel control portion 11. Panel control portion 11 displays the screen input from screen information management portion 23 on display portion 161. Therefore, while MFPs 100, 101, 102 are being remotely operated by portable information device 200, a screen designated by portable information device 200 is displayed on display portion 161.

Figure 6:
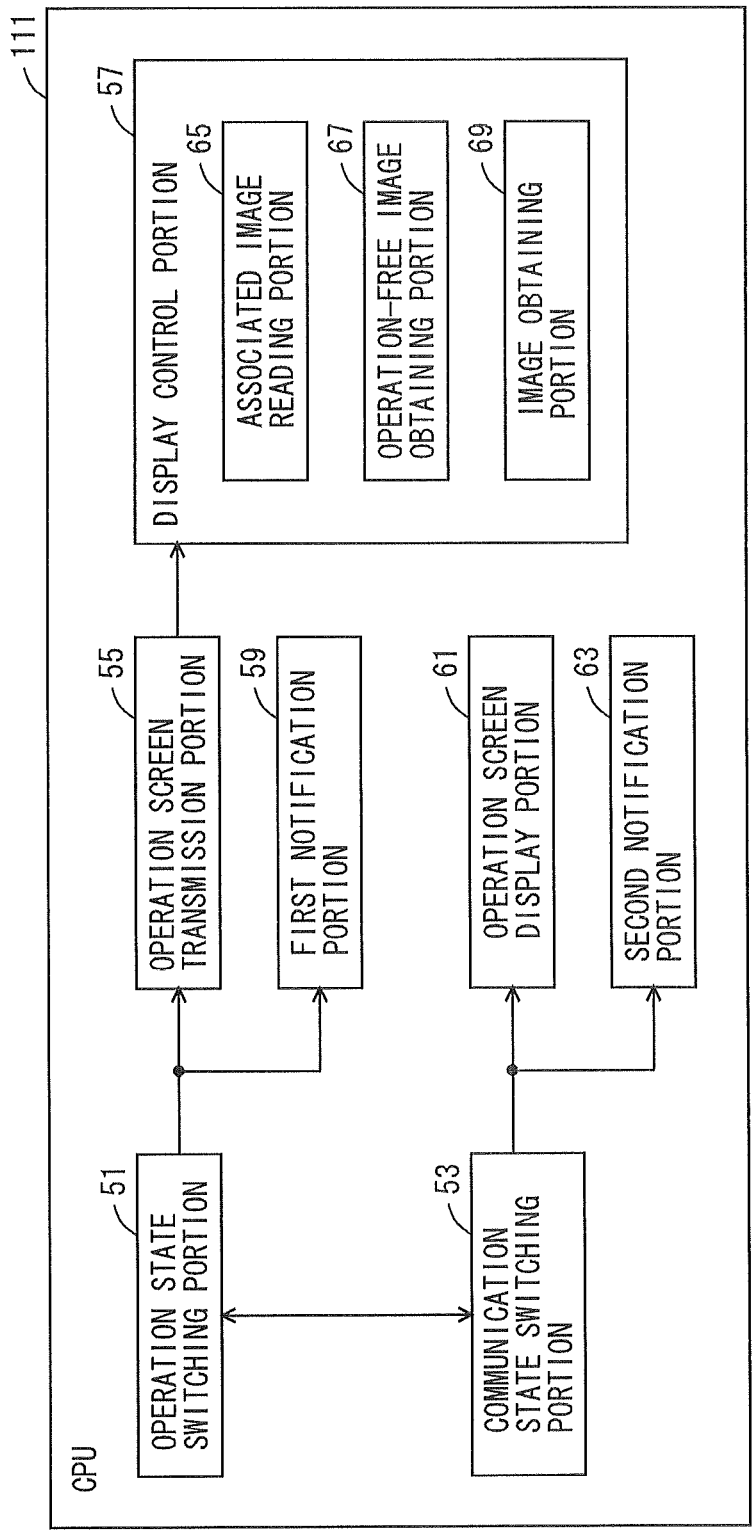
FIG. 6 is a functional block diagram schematically showing functions of a CPU 111 of the MFP.

FIG. 6 is a functional block diagram schematically showing functions of CPU 111 of the MFP. The functions of CPU 111 of MFP 100 shown in FIG. 6 are formed in CPU 111 when CPU 111 executes a program stored in ROM 113, HDD 115, or CD-ROM 118.

Referring to FIG. 6, CPU 111 includes an operation state switching portion 51, a communication state switching portion 53, an operation screen transmission portion 55 transmitting an operation screen to portable information device 200, a display control portion 57 controlling display portion 161, a first notification portion 59, an operation screen display portion 61 displaying an operation screen on display portion 161, and a second notification portion 63.

Operation state switching portion 51 switches an operation state between an operating state and a non-operating state. The operating state indicates a state in which a user is inputting an operation to operation portion 163. The non-operating state is a state that is not the operating state. Operation state switching portion 51 receives a communication state from communication state switching portion 53. The communication state, which will be described later, shows either a communicating state or a non-communicating state. Operation state switching portion 51 monitors an operation input to operation portion 163. When the communication state input from communication state switching portion 53 is the non-communicating state, if detecting that an operation is input to operation portion 163, operation state switching portion 51 switches the operation state to the operating state. When the operation state is being switched to the operating state, if a prescribed time has passed since an operation input to operation portion 163 was last detected, operation state switching portion 51 switches the operation state to the non-operating state. Operation state switching portion 51 outputs the operation state to communication state switching portion 53, operation screen transmission portion 55, and first notification portion 59.

Communication state switching portion 53 switches a communication state between the communicating state and the non-communicating state. The communicating state is a communication state showing a state in which a user is inputting an operation to portable information device 200. The non-communicating state is a communication state that is not the communicating state. Communication state switching portion 53 receives an operation state from operation state switching portion 51. Communication state switching portion 53 monitors a communication state of communication I/F 112. When the operation state input from operation state switching portion 51 is the non-operating state, if communication I/F 112 communicates with portable information device 200, communication state switching portion 53 switches the communication state to the non-communicating state. When the communication state is being switched to the communicating state, if a prescribed time has passed since communication I/F 112 last communicated with portable information device 200, communication state switching portion 53 switches the communication state to the non-communicating state. Communication state switching portion 53 outputs the communication state to operation state switching portion 51, operation screen display portion 61, and second notification portion 63.

When the communication state input from communication state switching portion 53 is the non-communicating state, if an operation to request display of an operation screen is input to operation portion 163, operation screen display portion 61 displays, on display portion 161, the operation screen corresponding to the request specified by the input operation. The operation input to operation portion 163 is, for example, an operation to request display of an operation screen for a copy process, an operation to request display of an operation screen for a facsimile transmission process, an operation to request display of an operation screen for a print process, an operation to request display of an operation screen for a data transmission process, or an operation to request display of an operation screen for a process of maintaining management information. A plurality of operation screens are stored beforehand in ROM 113, and the operation screen corresponding to the request specified by the operation input to operation portion 163 is selected from the plurality of operation screens and displayed on display portion 161.

When the communication state input from communication state switching portion 53 is the communicating state, if an operation is input to operation portion 163, second notification portion 63 displays an error screen, stored beforehand in ROM 113, on display portion 161. While the communication state is the communicating state, MFP 100 is being remotely operated by portable information device 200. Therefore, the user is notified that the operation input from portable information device 200 has a higher priority and the operation input to operation portion 163 is disabled. The error screen includes, for example, a message "Now being remotely operated. You cannot operate from the operation panel."

When the operation state input from operation state switching portion 51 is the non-operating state, if communication I/F 112 receives a request from portable information device 200, operation screen transmission portion 55 transmits an operation screen corresponding to the received request to portable information device 200 through communication I/F 112. The request received from portable information device 200 is, for example, a transmission request for an operation screen for a copy process, a transmission request for an operation screen for a facsimile transmission process, a transmission request for an operation screen for a print process, a transmission request for an operation screen for a data transmission process, or a transmission request for an operation screen for maintaining management information. A plurality of operation screens for remote operation to be transmitted to portable information device 200 are stored beforehand in ROM 113. The operation screen corresponding to the request received by communication I/F 112 from portable information device 200 is selected from the plurality of operation screens for remote operation and transmitted to portable information device 200 through communication I/F 112. Operation screen transmission portion 55 outputs, to display control portion 57, an operation screen name for identifying the transmitted operation screen and device identification information for identifying portable information device 200 that has transmitted the operation screen. The device identification information is, for example, an IP (Internet Protocol) address or a MAC (Media Access Control) address.

Display control portion 57 determines whether the portable device information is registered with reference to a registration table stored beforehand in HDD 115.

Figures 7, 8:
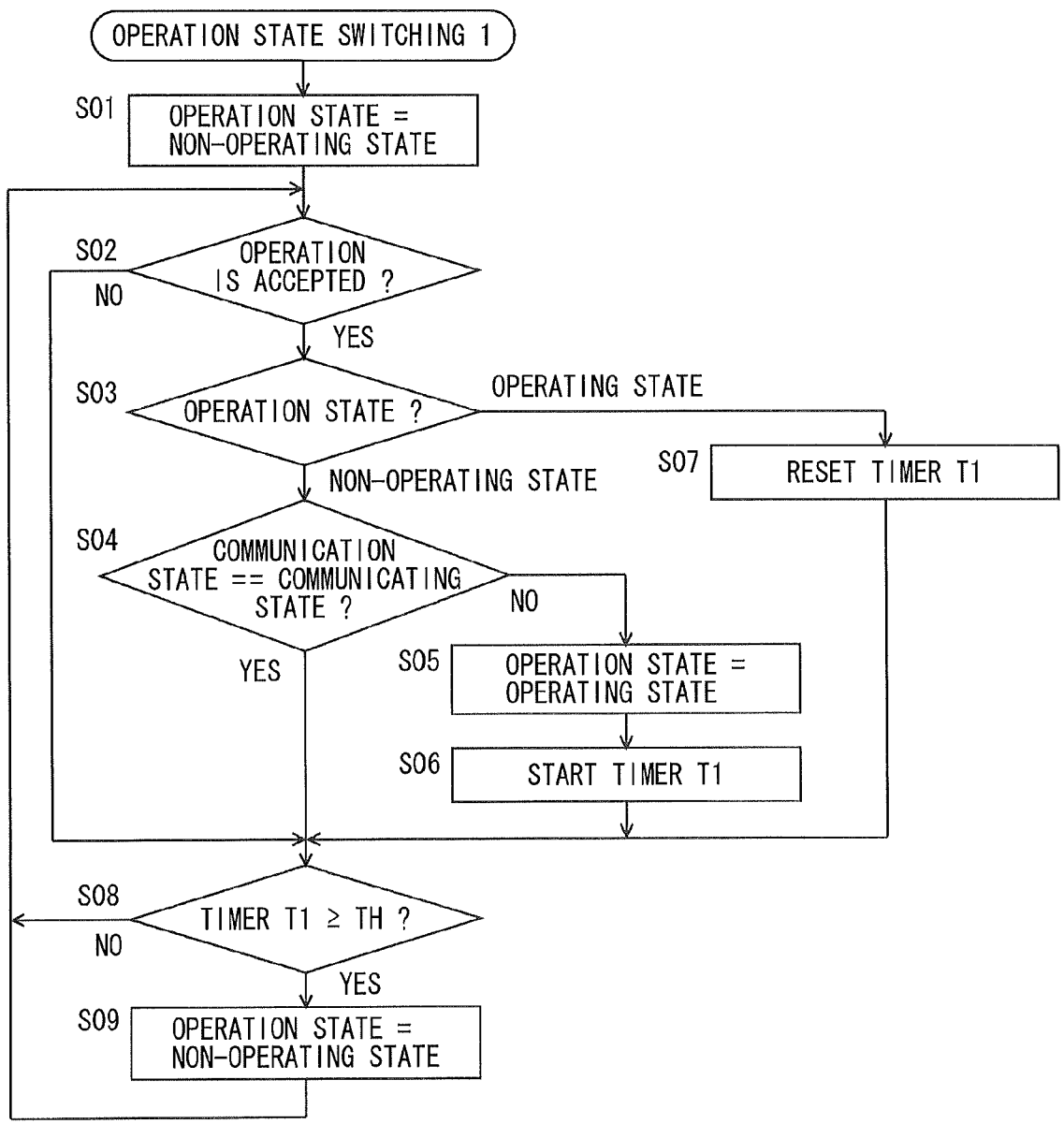
FIG. 7 shows an exemplary format of a registration table.
FIG. 8 is a flowchart showing an exemplary flow of an operation state switching process.

FIG. 7 shows an exemplary format of the registration table. Referring to FIG. 7, the registration table includes a registration record in which a registered device and a registered image are associated with each other. A registration record includes an item of registered device name and an item of registered image. The device identification information for identifying the device is set in the item of registered device name. The URL, which is the network address of the registered image, is set in the item of registered image.

Returning to FIG. 6, display control portion 57 searches the registration table stored in HDD 115 and, if the registration record including the device identification information input from operation screen transmission portion 55 exists, determines that portable information device 200 is registered.

Display control portion 57 includes an associated image reading portion 65, an operation-free image obtaining portion 67, and an image obtaining portion 69. Display control portion 57 activates one of associated image reading portion 65 and operation-free image obtaining portion 67 when it is determined that portable information device 200 is not registered. Whether to activate associated image reading portion 65 or operation-free image obtaining portion 67 may be set beforehand.

Associated image reading portion 65 reads out, from HDD 115, the image associated beforehand with the operation screen name input from operation screen transmission portion 55. A plurality of help screens corresponding to a plurality of operation screen names are stored in HDD 115. The help screen is a screen including graphics and/or a message for assisting in inputting in accordance with the operation screen specified by the operation screen name. Display control portion 57 displays an image of the help screen read by associated image reading portion 65 on display portion 161.

Operation-free image obtaining portion 67 obtains an advertisement image by reading out an advertisement image stored beforehand in HDD 115. The advertisement image is, for example, an image for advertisement provided by a sponsor. Operation-free image obtaining portion 67 also obtains a notice image by reading out a notice image stored in a predetermined storage area in HDD 115. The notice image may be, for example, a newsletter or announcement, or, if the user operating MFP 100 can be identified by user authentication, may be an email sent to the authenticated user. Display control portion 57 displays the advertisement image or the notice image on display portion 161. Whether to display an advertisement image or a notice image may be set beforehand, or they may be displayed one by one.

In response to occurrence of an error during operation of MFP 100, operation-free image obtaining portion 67 obtains a troubleshoot screen corresponding to the error from HDD 115. Display control portion 57 displays the obtained troubleshoot screen on display portion 161, in place of an advertisement image or registered image.

In response to document scanning portion 140 scanning a document, operation-free image obtaining portion 67 obtains a document image output by document scanning portion 140 scanning a document. Display control portion 57 displays the obtained document image on display portion 161, in place of an advertisement image or registered image. In other words, when a scan process is executed, a document image is previewed.

Display control portion 57 activates image obtaining portion 69 when it is determined that portable information device 200 is registered. Image obtaining portion 69 obtains a registered image specified by the network address associated with the device identification information of portable information device 200 by the registration record. Display control portion 57 displays the obtained registered image on display portion 161. Accordingly, the user of portable information device 200 can allow the image registered beforehand in MFP 100 to appear on display portion 161.

When the operation state input from operation state switching portion 51 is the operating state, if communication I/F 112 receives a request from portable information device 200, first notification portion 59 transmits an error screen stored in ROM 113 to portable information device 200 through communication I/F 112. While the operation state is the operating state, a user is operating MFP 100 using operation portion 163. Therefore, a user is notified that the operation input to operation portion 163 is enabled and the operation input from portable information device 200 is disabled. The error screen includes, for example, a message "Panel is now being operated. You cannot perform remote operation."

FIG. 8 is a flowchart showing an exemplary flow of an operation state switching process. The operation state switching process is executed by CPU 111 when CPU 111 of MFP 100 executes a program stored in ROM 113, HDD 115, or CD-ROM 118. Referring to FIG. 8, CPU 111 sets an operation state to the non-operating state (step S01). In the next step S02, it is determined whether an operation is accepted. It is determined that an operation is accepted if operation portion 163 detects input of an operation by a user. If an operation is accepted (YES in step S02), the process proceeds to step S03. If not (NO in step S02), the process proceeds to step S08.

In step S03, the process branches depending on the operation state. If the operation state is the non-operating state, the process proceeds to step S04. If the operation state is the operating state, the process proceeds to step S07. In step S04, the process branches depending on the communication state. If the communication state is the communicating state, the process proceeds to step S08. If the communication state is the non-communicating state, the process proceeds to step S05.

In step S05, the operation state is set to the operating state. In the next step S06, a timer T1 is started, and the process then proceeds to step S08. Timer T1 counts the elapsed time since the operation was accepted. On the other hand, in step S07, timer T1 is reset, and the process then proceeds to step S08. In step S08, it is determined whether the value of timer T1 is equal to or greater than a threshold value TH. If the value of timer T1 is equal to or greater than threshold value TH, the process proceeds to step S09. If not, the process skips step S09 and returns to step S02. In step S09, the operation state is set to the non-operating state. The process then returns to step S02.

As a result of execution of the operation state switching process, when an operation is input to operation portion 163, an operation state is switched to the operating state, if the communication state is not the communicating state. If no operation is input until the elapsed time since input of the operation to operation portion 163 reaches threshold value TH, the operation state is switched to the non-operating state. If the next operation is input before threshold value TH is reached after the operation was input to operation portion 163, the operation state is kept in the operating state.

Figure 9:
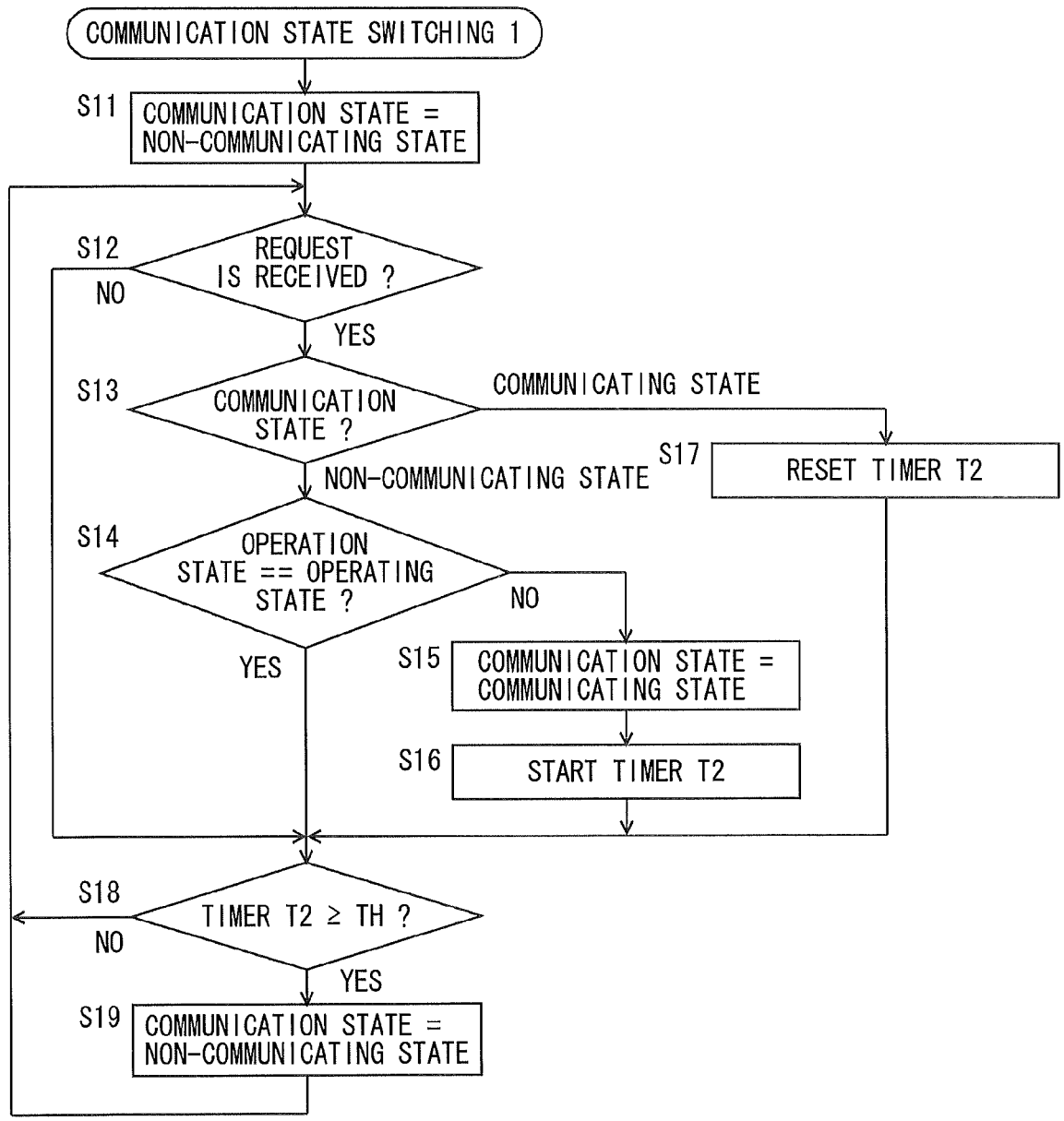
FIG. 9 is a flowchart showing an exemplary flow of a communication state switching process.

FIG. 9 is a flowchart showing an exemplary flow of a communication state switching process. The communication state switching process is executed by CPU 111 when CPU 111 of MFP 100 executes a program stored in ROM 113, HDD 115, or CD-ROM 118. Referring to FIG. 9, CPU 111 sets a communication state to the non-communicating state (step S11). In the next step S12, it is determined whether a request is received. It is determined whether communication I/F 112 receives a request from portable information device 200. If a request is received (YES in step S12), the process proceeds to step S13. If not (NO in step S12), the process proceeds to step S18.

In step S13, the process branches depending on the communication state. If the communication state is the non-communicating state, the process proceeds to step S14. If the communication state is the communicating state, the process proceeds to step S17. In step S14, the process branches depending on the operation state. If the operation state is the operating state, the process proceeds to step S18. If the operation state is the non-operating state, the process proceeds to step S15.

In step S15, the communication state is set to the communicating state. In the next step S16, a timer T2 is started, and the process then proceeds to step S18. Timer T2 counts the elapsed time since communication I/F 112 last communicated with portable information device 200. On the other hand, in step S17, timer T2 is reset, and the process proceeds to step S18. In step S18, it is determined whether the value of timer T2 is equal to or greater than a threshold value TH. If the value of timer T2 is equal to or greater than the threshold value TH, the process proceeds to step S19. If not, the process skips step S19 and returns to step S12. In step S19, the communication state is set to the non-communicating state, and the process then returns to step S12.

As a result of execution of the communication state switching process, when communication I/F portion 112 communicates with portable information device 200, a communication state is switched to the communicating state, if the operation state is not the operating state. If communication I/F portion 112 does not communication with portable information device 200 until the elapsed time since communication I/F portion 112 last communicated with portable information device 200 reaches the threshold value TH, the communication state is switched to the non-communicating state. If communication I/F portion 112 communicates with portable information device 200 before the threshold value TH is reached after communication I/F portion 112 last communicated with portable information device 200, the communication state is kept in the communicating state.

Figure 10:
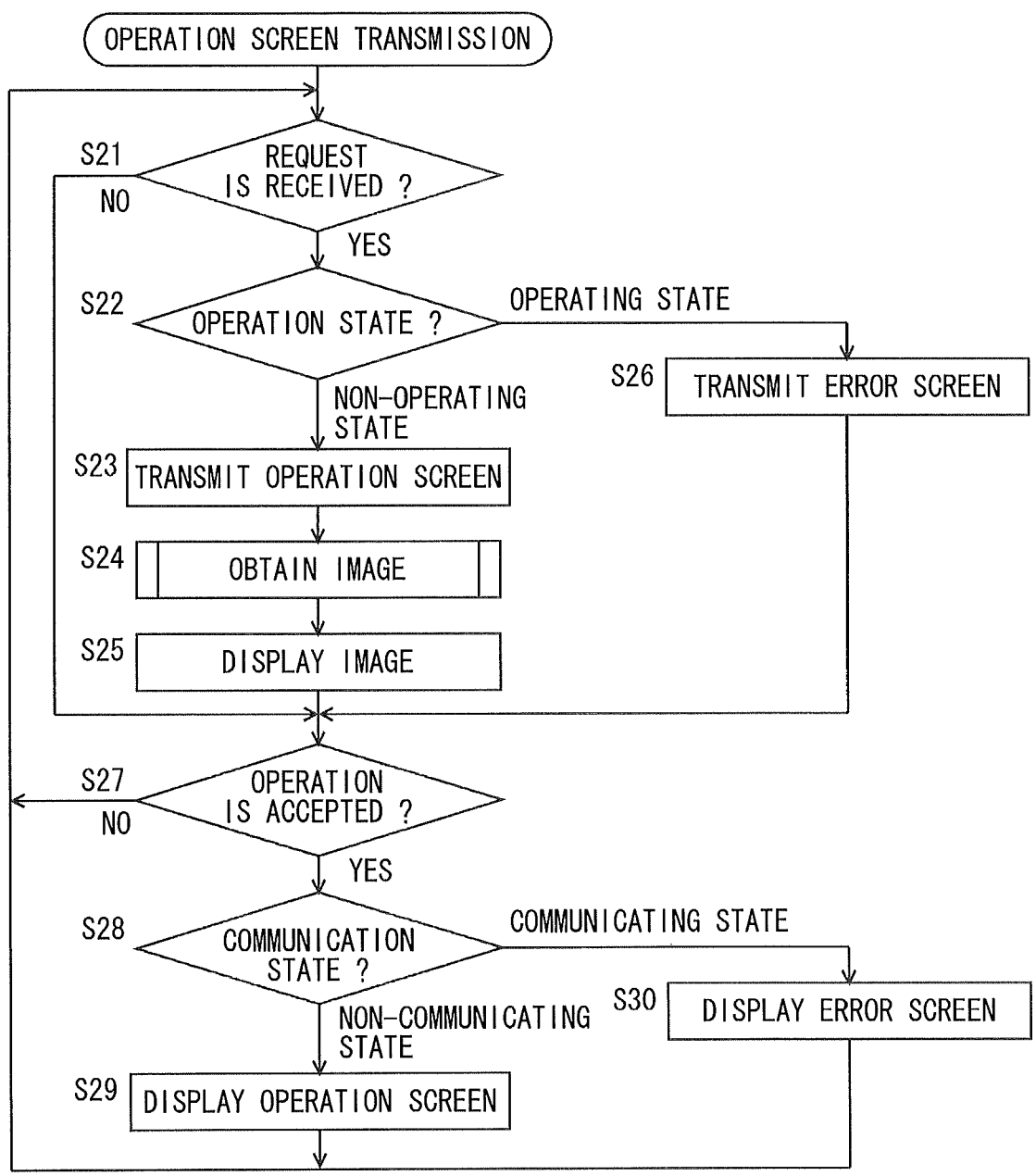
FIG. 10 is a flowchart showing an exemplary flow of an operation screen transmission process.

FIG. 10 is a flowchart showing an exemplary flow of an operation screen transmission process. The operation screen transmission process is executed by CPU 111 when CPU 111 of MFP 100 executes a program stored in ROM 113, HDD 115, or CD-ROM 118.

Referring to FIG. 10, CPU 111 determines whether a request is received (step S21). It is determined whether communication I/F portion 112 receives a request from portable information device 200. If a request is received (YES in step S21), the process proceeds to step S22. If not (NO in step S21), the process proceeds to step S27.

In step S22, the process branches depending on the operation state. If the operation state is the non-operating state, the process proceeds to step S23. If the operation state is the operating state, the process proceeds to step S26. In step S26, an error screen is transmitted through communication I/F portion 112 to portable information device 200 that has transmitted the request. The process then proceeds to step S27. The error screen includes, for example, a message "Panel is now being operated. You cannot perform remote operation."

In step S23, an operation screen is transmitted through communication I/F portion 112 to portable information device 200 that has transmitted the request. The operation screen is the one corresponding to the request received in step S12.

In the next step S24, an image obtaining process is executed. The image obtaining process will be detailed later.

In step S25, the image obtained through the image obtaining process executed in step S24 is displayed on display portion 161, and the process then proceeds to step S27.

In step S27, it is determined whether an operation is accepted. It is determined whether operation portion 163 detects input of an operation by a user. If an operation is accepted (YES in step S27), the process proceeds to step S28. If not (NO in step S27), the process returns to step S21.

In step S28, the process branches depending on the communication state. If the communication state is the non-communicating state, the process proceeds to step S29. If the communication state is the communicating state, the process proceeds to step S30. In step S29, the operation screen corresponding to the request specified by the operation accepted in step S27 is displayed on display portion 161, and the process then returns to step S21. On the other hand, in step S30, an error screen is displayed on display portion 161, and the process then returns to step S21. The error screen includes, for example, a message "Now being remotely operated. You cannot operate from the operation panel."

FIG. 11 is a flowchart showing an exemplary flow of the image obtaining process. The image obtaining process is a process executed in step S24 in FIG. 10. Referring to FIG. 11, the transmission source of the request received in step S21 in FIG. 10 is specified (step S31). The transmission source is specified by obtaining the device identification information of portable information device 200 that has transmitted the request. In the next step S32, it is determined whether portable information device 200 that has transmitted the request is a registered device. The registration table stored in HDD 115 is searched, and if a registration record that includes the device identification information of the transmission source specified in step S21 is found, it is determined that portable information device 200 is a registered device. If it is determined that portable information device 200 is a registered device, the process proceeds to step S33. If not, the process proceeds to step S35.

In step S33, the URL associated with the registered device is obtained. Obtained is the URL set in the item of registered image in the registration record that includes the device identification information of the transmission source specified in step S21, among the registration records included in the registration table stored in HDD 115. The image specified by the URL is, for example, a Web page stored in portable information device 200. In the next step S34, the image specified by the obtained URL is obtained, and the process returns to the operation screen transmission process. On the other hand, in step S35, the image specified by a predetermined URL is obtained, and the process returns to the operation screen transmission process.

The image specified by a predetermined URL includes a help screen image, an advertisement image, a notice image, a troubleshoot screen image, and a document image, which are stored in HDD 115. The help screen image is an associated image, whereas the advertisement image, the notice image, the troubleshoot screen image, and the document image are operation-free images. Which of the help screen image, the announcement image, the troubleshoot screen image, and the document image is to be displayed is set by the user. The URL is changed with the operation screen to be transmitted, occurrence of an error, occurrence of a document scanning operation by scanning portion 130, or the passage of a prescribed time.

<Modification of Operation State Switching Portion and Communication State Switching Portion>

Operation state switching portion 51 as described above monitors operations input to operation portion 163, switches the operation state to the operating state if detecting that an operation is input to operation portion 163 when the communication state input from communication state switching portion 53 is the non-communicating state, and switches the operation state to the non-operating state when a prescribed time has passed since the operation input to operation portion 163 was last detected. Operation state switching portion 51 in a modification switches the operation state to the operating state when a user operates operation portion 163 to log in, and switches the operation state to the non-operating state when the user logs off.

Communication state switching portion 53 as described above monitors the communication state of communication I/F 112, switches the communication state to the communicating state when communication I/F 112 communicates with portable information device 200, and switches the communication state to the non-communicating state when a prescribed time has passed since communication I/F 112 last communicated with portable information device 200. Communication state switching portion 53 in a modification switches the communication state to the communicating state when a user operates the portable information device to log in, and switches the communication state to the non-communicating state when the user logs off.

For this purpose, CPU 111 includes an authentication portion for authenticating a user and stores a set of user identification information and password of a user who is permitted to use MFP 100, in HDD 115. When a user enters user identification information and a password to operation portion 163, the authentication portion authenticates the user if the entered set of user identification information and password is stored in HDD 115. If not stored, the user is not authenticated. When the user is authenticated, the authentication portion permits log-in. The authentication portion logs off the user who has logged in, if the user inputs a log-off operation to operation portion 163, or if the user inputs no operation continuously for a prescribed time after log-in is permitted. The authentication portion receives a set of user identification information and password entered in portable information device 200 by a user, through communication I/F 112, authenticates the user if the received set of user identification information and password is stored in HDD 115, and does not authenticate the user if it is not stored. The authentication portion permits log-in if the user is authenticated. The authentication portion logs off the user who has logged in, if communication I/F portion 112 receives a log-off operation input to portable information device 200 by the user, or if communication I/F portion 112 does not communication with portable information device 200 continuously for a prescribed time.

Figure 12:
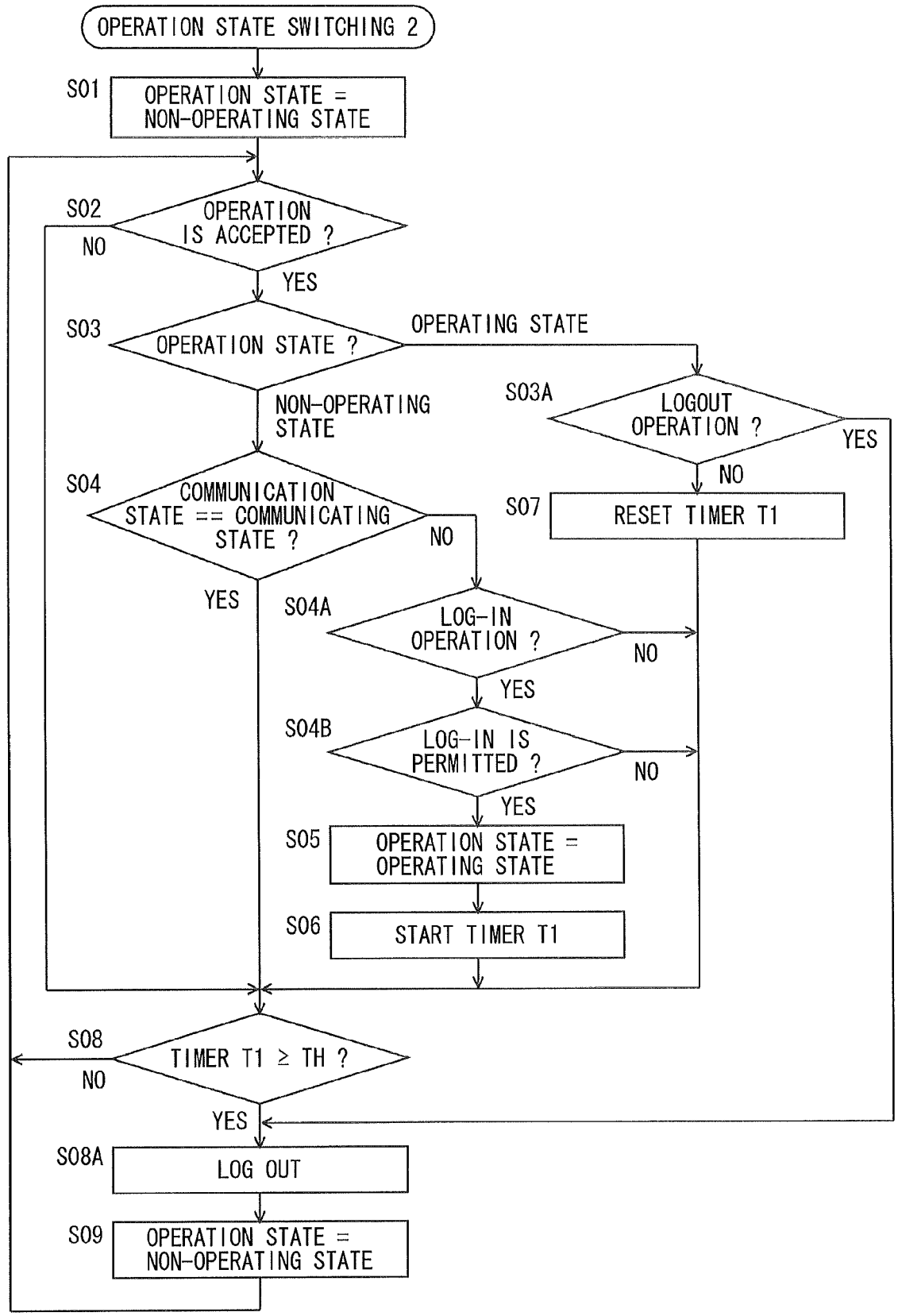
FIG. 12 is a flowchart showing an exemplary flow of an operation state switching process in a modification.

FIG. 12 is a flowchart showing an exemplary flow of the operation state switching process in the modification. The process in FIG. 12 differs from the operation state switching process shown in FIG. 8 in that step S04A and step S04B are added between step S04 and step S05, that step S03A is added between step S03 and step S07, and that step S8A is added between step S08 and step S09. The remaining process is the same as the process shown in FIG. 8, and therefore, a description thereof will not be repeated here.

If it is determined that the communication state is the non-communicating state in step S04, it is determined whether the operation accepted in step S02 is a login operation, in step S04A. If it is a login operation, the process proceeds to step S04B. If not, the process proceeds to step S08. The log-in operation is an operation of entering user identification information and a password. In step S04B, authentication is performed based on the user identification information and password entered through the log-in operation, and whether to permit log-in is determined. If log-in is permitted, the process proceeds to step S05. If not, the process proceeds to step S08.

If it is determined that the operation state is the operating state in step S03, the process proceeds to step S03A. In step S03A, it is determined whether the operation accepted in step S02 is a log-out operation. If it is a log-out operation, the process proceeds to step S08A. If not, the process proceeds to step S07.

If it is determined that it is a log-out operation in step S03A, or if it is determined that the value of timer T1 is equal to or greater than the threshold value T1 in step S08, the user who has been permitted to log in is logged off, in step S08A. The process then proceeds to step S09.

Figure 13:
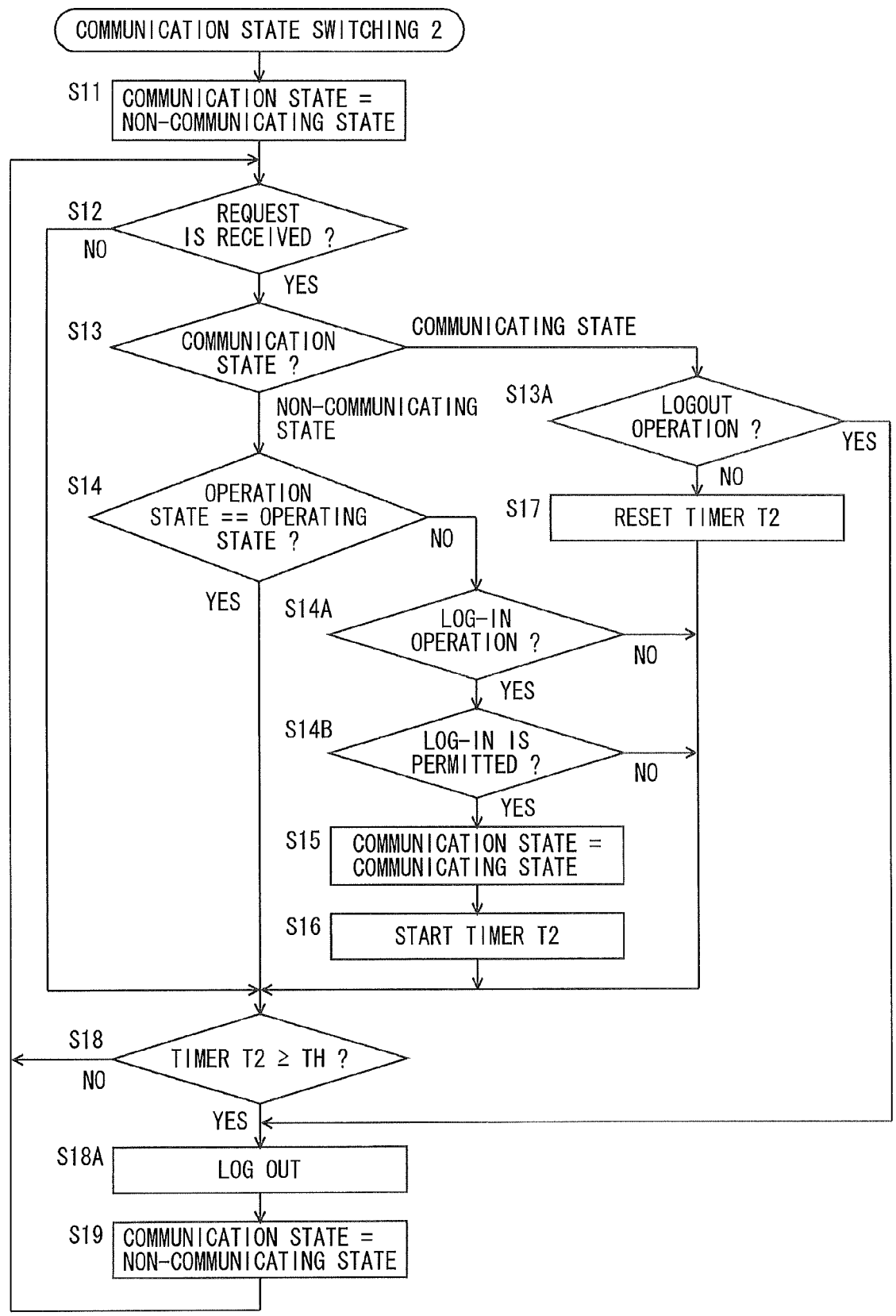
FIG. 13 is a flowchart showing an exemplary flow of a communication state switching process in a modification.

FIG. 13 is a flowchart showing an exemplary flow of the communication state switching process in the modification. The process in FIG. 13 differs from the communication state switching process shown in FIG. 9 in that steps S14A and S14B are added between step S14 and step S15, that step S13A is added between step S13 and step S17, and that step S18A is added between step S18 and step S19. The remaining process is the same as the process shown in FIG. 9, and therefore, a description thereof will not be repeated here.

If it is determined that the operation state is the non-operating state in step S14, it is determined whether the request received in step S12 is a log-in request, in step S14A. If it is a log-in request, the process proceeds to step S14B. If not, the process proceeds to step S18. The log-in request includes user identification information and a password. In step S14B, authentication is performed based on the user identification information and password included in the log-in request, and whether to permit log-in is determined. If log-in is permitted, the process proceeds to step S15. If not, the process proceeds to step S18.

If it is determined that the communication state is the communicating state in step S13, the process proceeds to step S13A. In step S13A, it is determined whether the request received in step S12 is a log-out request. If it is a log-out request, the process proceeds to step S18A. If not, the process proceeds to step S17.

If it is determined that the request is a log-out request in step S13A, or if the value of timer T2 is determined to be equal to greater than the threshold value TH in step S18, the user who has been permitted to log in is logged off in step S18A. The process then proceeds to step S19.

As described above, in image forming system 1 in the present embodiment, when an operation state is being switched to the non-operating state in which a user is not inputting an operation to operation portion 163, in response to reception of a request from portable information device 200, MFPs 100, 101, 102 each transmit an operation screen corresponding to the received request to portable information device 200. In response to transmission of the operation screen, each MFP displays an image different from the operation screen on display portion 161. Therefore, while remotely operating MFPs 100, 101, 102 with portable information device 200, users can view an image, which is different from the operation screen, on display portion 161.

On display portion 161, a help screen image is displayed as an associated image predetermined for the operation screen. This helps the user with operations.

If portable information device 200 that has transmitted a request is registered in the registration table, an image specified by a URL predetermined for portable information device 200 is displayed on display portion 161. Thus, different images can be displayed for different portable information devices 200. In addition, the user of portable information device 200 can view the desired image on display portion 161.

If a request is received from portable information device 200 in the operating state in which a user is inputting an operation to operation portion 163, an error screen is transmitted to portable information device 200, thereby limiting a remote operation by portable information device 200 during operation using operation portion 163.

On the other hand, if an operation is input to operation portion 163 in the communicating state in which a user is inputting an operation to portable information device 200, an error screen is displayed on display portion 161. Therefore, an operation using operation portion 163 can be limited during remote operation using portable information device 200.

Although image forming system 1 has been described in the foregoing embodiment, it is needless to say that the present invention can be specified as a display control method for executing the processes shown in FIG. 8 to FIG. 13 and a display control program for causing CPU 111 controlling MFPs 100, 101, 102 to execute the display control method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
a communication portion to communicate with a portable information device;
an operation accepting portion to accept an operation by a user;
an operation state switching portion to switch an operation state between an operating state showing a state in which a user is inputting an operation to said operation accepting portion and a non-operating state that is not said operating state;
a display portion to display an image;
an operation screen transmission portion to, in response to a request being received from said portable information device when an operation state is being switched to said non-operating state, transmit an operation screen corresponding to said received request to said portable information device through said communication portion; and
a display control portion to, in response to transmission of said operation screen, display on said display portion an image of a help screen for assisting in inputting in accordance with said operation screen.

2. The image forming apparatus according to claim 1, wherein said display control portion includes an associated image reading portion to read an image of said help screen as an associated image predetermined for said operation screen.

3. The image forming apparatus according to claim 2, further comprising an address storage portion to store beforehand a set of device identification information for identifying a portable information device and a network address,
wherein said associated image reading portion includes an image obtaining portion to obtain an image based on a network address that makes a set with device identification information of said portable information device that has transmitted said request.

4. The image forming apparatus according to claim 1, further comprising a first notification portion to transmit an error screen to said portable information device in response to said communication portion receiving said request from said portable information device when an operation state is being switched to said operating state.

5. The image forming apparatus according to claim 1, further comprising:
a communication state switching portion to switch a communication state between a communicating state indicating a state in which a user is inputting an operation to said portable information device and a non-communicating state that is not said communicating state; and
a second notification portion to display an error screen on said display portion in response to an operation being accepted by said operation accepting portion when a communication state is being switched to said communicating state.

6. The image forming apparatus according to claim 5, further comprising an operation screen display portion to, in response to an operation being accepted by said operation accepting portion when a communication state is being switched to said non-communicating state, display an operation screen specified by the accepted operation on said display portion.

7. The image forming apparatus according to claim 1, further comprising a communication state switching portion to switch a communication state between a communicating state indicating a state in which a user is inputting an operation to said portable information device and a non-communicating state that is not said communicating state, wherein
if said communication portion communicates with said portable information device when an operation state is being switched to said non-operating state, said communication state switching portion switches to said communicating state, and if a prescribed time has passed since said communication portion last communicated with said portable information device, said communication switching portion switches from said communicating state to said non-communicating state, and
if said operation accepting portion accepts an operation when a communication state is being switched to said non-communicating state, said operation state switching portion switches to said operating state, and if a prescribed time has passed since said operation accepting portion last accepted an operation, said operation state switching portion switches from said operating state to said non-operating state.

8. The image forming apparatus according to claim 1, further comprising:
an operator management portion to perform authentication based on user identification information for identifying a user and to permit log-in; and
a communication state switching portion to switch a communication state between a communicating state indicating a state in which a user is inputting an operation to said portable information device and a non-communicating state that is not said communicating state, wherein
said communication state switching portion switches to said communicating state while said operator management portion is permitting log-in based on user identification information received from said portable information device by said communication portion when an operation state is being switched to said non-operating state, and said communication state switching portion switches from said communicating state to said non-communicating state when log-in is no longer permitted, and
said operation state switching portion switches to said operating state while said operator management portion is permitting log-in based on user identification information accepted by said operation accepting portion when a communication state is being switched to said non-communicating state, and said operation state switching portion switches from said operating state to said non-operating state when log-in is no longer permitted.

9. A display control method executed in an image forming apparatus including a communication portion to communicate with a portable information device, an operation accepting portion to accept an operation by a user, and a display portion to display an image, said method comprising the steps of:
   switching an operation state between an operating-state indicating a state in which a user is inputting an operation to said operation accepting portion and a non-operating state that is not said operating state;
   in response to a request being received from said portable information device when an operation state is being switched to said non-operating state, transmitting an operation screen corresponding to said received request to said portable information device through said communication portion; and
   in response to transmission of said operation screen, displaying on said display portion an image of a help screen for assisting in inputting in accordance with said operation screen.

10. The display control method according to claim 9, wherein said step of displaying includes the step of reading out an image of said help screen as an associated image predetermined for said operation screen.

11. The display control method according to claim 10, further comprising the step of storing beforehand a set of device identification information for identifying a portable information device and a network address,
   wherein said step of reading out an associated image includes the step of obtaining an image based on a network address that makes a set with device identification information of said portable information device that has transmitted said request.

12. The display control method according to claim 9, further comprising the step of, in response to said communication portion receiving said request from said portable information device when an operation state is being switched to said operating state, transmitting an error screen to said portable information device.

13. The display control method according to claim 9, further comprising the steps of:
   switching a communication state between a communicating state indicating a state in which a user is inputting an operation to said portable information device and a non-communicating state that is not said communicating state; and
   displaying an error screen on said display portion in response to an operation being accepted by said operation accepting portion when a communication state is being switched to said communicating state.

14. The display control method according to claim 13, further comprising the step of, in response to an operation being accepted by said operation accepting portion when a communication state is being switched to said non-communicating state, displaying an operation screen specified by the accepted operation on said display portion.

15. The display control method according to claim 9, further comprising the step of switching a communication state between a communicating state indicating a state in which a user is inputting an operation to said portable information device and a non-communicating state that is not said communicating state,
   said step of switching a communication state including the steps of:
      switching to said communicating state if said communication portion communicates with said portable information device when an operation state is being switched to said non-operating state; and
      switching from said communicating state to said non-communicating state if a prescribed time has passed since said communication portion last communicated with said portable information device,
   said step of switching an operation state including the steps of:
      switching to said operating state if said operation accepting portion accepts an operation when a communication state is being switched to said non-communicating state; and
      switching from said operating state to said non-operating state if a prescribed time has passed since said operation accepting portion last accepted an operation.

16. The display control method according to claim 9, further comprising the steps of:
   performing authentication based on user identification information for identifying a user, and permitting log-in; and
   switching a communication state between a communicating state indicating a state in which a user is inputting an operation to said portable information device and a non-communicating state that is not said communicating state,
   said step of switching a communication state including the steps of:
      switching to said communicating state while log-in is being permitted based on user identification information received from said portable information device by said communication portion in said step of permitting log-in when an operation state is being switched to said non-operating state; and
      switching from said communicating state to said non-communicating state when log-in is no longer permitted in said step of permitting log-in,
   said step of switching an operation state including the steps of:
      switching to said operating state while log-in is being permitted based on user identification information accepted by said operation accepting portion in said step of permitting log-in when a communication state is being switched to said non-communicating state; and
      switching from said operating state to said non-operating state when log-in is no longer permitted in said step of permitting log-in.

17. A non-transitory computer-readable recording medium encoded with a display control program executed in a computer controlling an image forming apparatus including a communication portion to communicate with a portable information device, an operation accepting portion to accept an operation by a user, and a display portion to display an image, said program causing said computer to execute processing comprising the steps of:
   switching an operation state between an operating-state indicating a state in which a user is inputting an operation to said operation accepting portion and a non-operating state that is not said operating state;
   in response to a request being received from said portable information device when an operation state is being switched to said non-operating state, transmitting an operation screen corresponding to said received request to said portable information device through said communication portion; and in response to transmission of said operation screen, displaying on said display portion an image of a help screen for assisting in inputting in accordance with said operation screen.

18. The non-transitory computer-readable recording medium encoded with a display control program according to claim 17, wherein said step of displaying includes the step of reading out an image of said help screen as an associated image predetermined for said operation screen.

19. The non-transitory computer-readable recording medium encoded with a display control program according to claim 18, said program further comprising the step of storing beforehand a set of device identification information for identifying a portable information device and a network address, wherein said step of reading out an associated image includes the step of obtaining an image based on a network address that makes a set with device identification information of said portable information device that has transmitted said request.

20. The non-transitory computer-readable recording medium encoded with a display control program according to claim 17, said program further comprising the step of, in response to said communication portion receiving said request from said portable information device when an operation state is being switched to said operating state, transmitting an error screen to said portable information device.

21. The non-transitory computer-readable recording medium encoded with a display control program according to claim 17, said program further comprising the steps of:

switching a communication state between a communicating state indicating a state in which a user is inputting an operation to said portable information device and a non-communicating state that is not said communicating state; and displaying an error screen on said display portion in response to an operation being accepted by said operation accepting portion when a communication state is being switched to said communicating state.

22. The non-transitory computer-readable recording medium encoded with a display control program according to claim 21, said program further comprising the step of, in response to an operation being accepted by said operation accepting portion when a communication state is being switched to said non-communicating state, displaying an operation screen specified by the accepted operation on said display portion.

23. The non-transitory computer-readable recording medium encoded with a display control program according to claim 17, said program further comprising the step of switching a communication state between a communicating state indicating a state in which a user is inputting an operation to said portable information device and a non-communicating state that is not said communicating state, said step of switching a communication state including the steps of:

switching to said communicating state if said communication portion communicates with said portable information device when an operation state is being switched to said non-operating state; and switching from said communicating state to said non-communicating state if a prescribed time has passed since said communication portion last communicated with said portable information device, said step of switching an operation state including the steps of:

switching to said operating state if said operation accepting portion accepts an operation when a communication state is being switched to said non-communicating state; and switching from said operating state to said non-operating state if a prescribed time has passed since said operation accepting portion last accepted an operation.

24. The non-transitory computer-readable recording medium encoded with a display control program according to claim 17, said program further comprising the steps of:

performing authentication based on user identification information for identifying a user, and permitting log-in; and switching a communication state between a communicating state indicating a state in which a user is inputting an operation to said portable information device and a non-communicating state that is not said communicating state, said step of switching a communication state including the steps of:

switching to said communicating state while log-in is being permitted based on user identification information received from said portable information device by said communication portion in said step of permitting log-in when an operation state is being switched to said non-operating state; and switching from said communicating state to said non-communicating state when log-in is no longer permitted in said step of permitting log-in, said step of switching an operation state including the steps of:

switching to said operating state while log-in is being permitted based on user identification information accepted by said operation accepting portion in said step of permitting log-in when a communication state is being switched to said non-communicating state; and switching from said operating state to said non-operating state when log-in is no longer permitted in said step of permitting log-in.

* * * * *